(12) United States Patent
Gul (10) Patent No.: US 6,484,587 B2
(45) Date of Patent: Nov. 26, 2002

(54) PRESSURE SENSOR

(75) Inventor: S. Asim Gul, Orono, MN (US)

(73) Assignee: Mamac Systems, Inc., Eden Prairie, MN (US)

( * ) Notice: Subject to any disclaimer, the term of this patent is extended or adjusted under 35 U.S.C. 154(b) by 0 days.

(21) Appl. No.: 09/778,676

(22) Filed: Feb. 7, 2001

(65) Prior Publication Data

US 2001/0032516 A1 Oct. 25, 2001

Related U.S. Application Data

(60) Provisional application No. 60/180,510, filed on Feb. 7, 2000.

(51) Int. Cl.$^7$ ................................................ G01L 7/00
(52) U.S. Cl. ........................................................ 73/756
(58) Field of Search ............................... 73/54, 119, 59, 73/720, 721, 724, 756, 153; 338/4

(56) References Cited

U.S. PATENT DOCUMENTS

| | | | | |
|---|---|---|---|---|
| 5,174,158 A | * | 12/1992 | Kremidas | 73/721 |
| 5,357,792 A | * | 10/1994 | Getenby | 73/719 |
| 5,698,773 A | * | 12/1997 | Blom et al. | 73/54.18 |
| 6,257,051 B1 | * | 6/2001 | Boyle et al. | 73/54.01 |

OTHER PUBLICATIONS

One paragraph page of "Barksdale Compact Explosion Proof Pressure Switch Fits Anywhere".
Four page Mamac Systems brochure entitled Pressure Transducer Model PR–264, Copyright 1996.
Two pages of article entitled M & C Measurement & Control News, M & C News, Dec. 1998.

* cited by examiner

Primary Examiner—Benjamin R. Fuller
Assistant Examiner—Marissa Ferguson
(74) Attorney, Agent, or Firm—Kinney & Lange, P.A.

(57) ABSTRACT

A pressure monitoring assembly includes an isolation valve assembly and a differential pressure sensor assembly. The rigid manifold has two pressure inlet ports which each communicate with respective pressure outlet ports through isolation valves. An equalization passage and valve connect the two pressure lines. The pressure sensor assembly is sized to mate directly with the monolithic manifold by having sensor inlet ports that line up with the pressure outlet ports. Pressure tight attachments releasably secure the pressure sensor assembly to the manifold, but are rigid to support the weight of the pressure sensor assembly. No bleeding valves are necessary. Orientation and the positioning and construction of the manifold effectively reduce the amount of heat transfer between the pressure lines and the pressure sensor(s).

21 Claims, 9 Drawing Sheets

FIG. 1

PRIOR ART

FIG. 2

PRIOR ART

PRESSURE SENSOR

CROSS-REFERENCE TO RELATED APPLICATION(S)

This application claims priority benefits from U.S. Patent Application No. 60/180,510, entitled DIFFERENTIAL PRESSURE SENSOR AND ISOLATION VALVE MANIFOLD ASSEMBLY, filed Feb. 7,2000.

BACKGROUND OF THE INVENTION

The present invention relates to pressure sensors. More particularly, the present invention relates to a pressure sensor body designed to permit rigid mounting of the pressure sensor to a larger assembly.

Differential pressure sensors or differential pressure transducers are known in the art. The differential pressure sensors include at least first and second pressure inlet ports. The first (low) pressure inlet port may be attached to a low pressure inlet line and the second (high) pressure port may be attached to a higher pressure inlet line. The differential pressure transmitter returns an electrical signal indicative of the difference in pressure between the higher pressure line and the low pressure line. The differential pressure transmitter is intended to measure a difference in pressure with substantially no flow between the pressure lines. The transmitter may include a single diaphragm or other sensor element affected by the low pressure and the higher pressure on both opposing sides, or it may include two separate pressure sensors with the measured pressure low pressure electrically compared against the measured high pressure.

Such pressure sensors are most commonly supplied on a stand-alone basis. Installation in the field may require two or more individuals: an electrician to run the electrical lines and a plumber or pipe-fitter to run the fluid lines. Additionally, the plumber or pipe-fitter may install isolation valves on the ends of the low pressure line and the high pressure line to facilitate removal or replacement of the pressure sensor(s) or transducer(s). The isolation valves can be closed to close off or "isolate" the high and low pressure lines from the pressure sensor elements.

Differential pressure sensors assemblies or differential pressure transmitter assemblies are known in the art. These assemblies incorporate both the pressure sensor assembly and the isolation valve assembly as a single manufactured product, and thus require less field installation time. In particular, the connections made between the isolation valves and the pressure sensor(s) may be made as a manufacturing step for the assembly rather than in the field.

Known differential pressure transmitters may be assembled from relatively low cost components, but assembly and/or installation time and costs may be significant. Improvements are needed to reduce the cost and increase the functionality both in the manufacture and in the installation of such pressure transmitters.

BRIEF SUMMARY OF THE INVENTION

The present invention is a sensor primarily including a sensing element and a sensor housing. The sensing element measures at least one fluid parameter, such as pressure. The sensor housing provides a sealed chamber in fluid communication with the sensing element. The sensor housing has a smooth surface for mating with the sensing element. The sensor housing also has a threaded interior surface opposite the sensing element for rotational attachment to a tubing or piping system. The sensor housing also has a flange defining two planar surfaces normal to the central axis of the interior chamber. One of the planar surfaces has threaded bore holes extending less than the full width of the flange, allowing for fixable attachment of the flange to a structure. In one aspect, a body extends outward from the flange, and provides the threaded interior chamber. The body has an exterior surface with at least one flat normal to the planar surfaces of the flange. The flats are positioned adjacent to each bore hole to allow the head of the screw to mate with the flange surface. In another embodiment, a neck extends from one side of the flange defining the interior chamber, and the sensing element is attached to a smooth surface of the neck.

While the above-identified FIGS. 3–19 set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
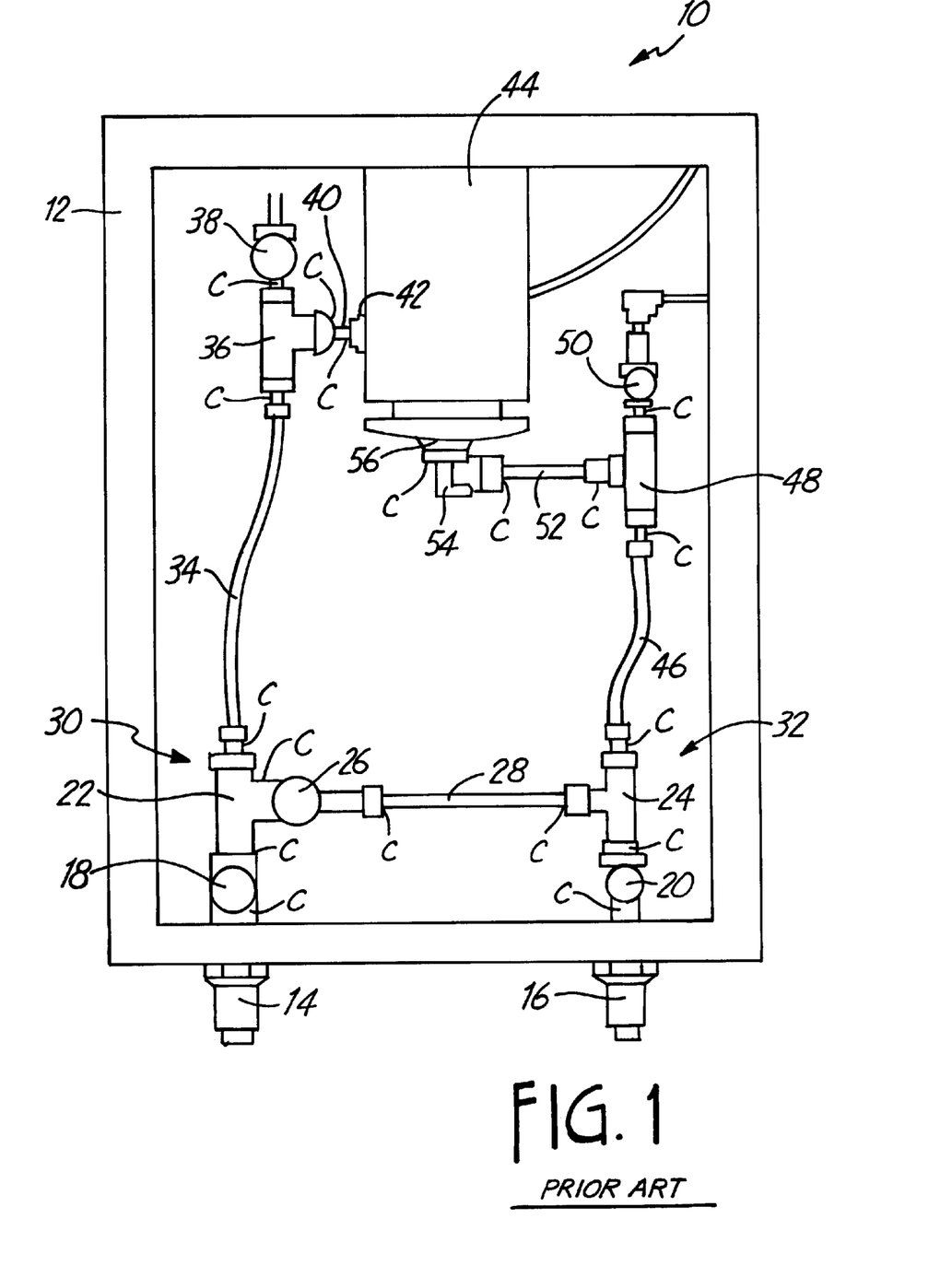
FIG. 1 is a drawing of a prior art differential pressure transmitter assembly.
Figure 2:
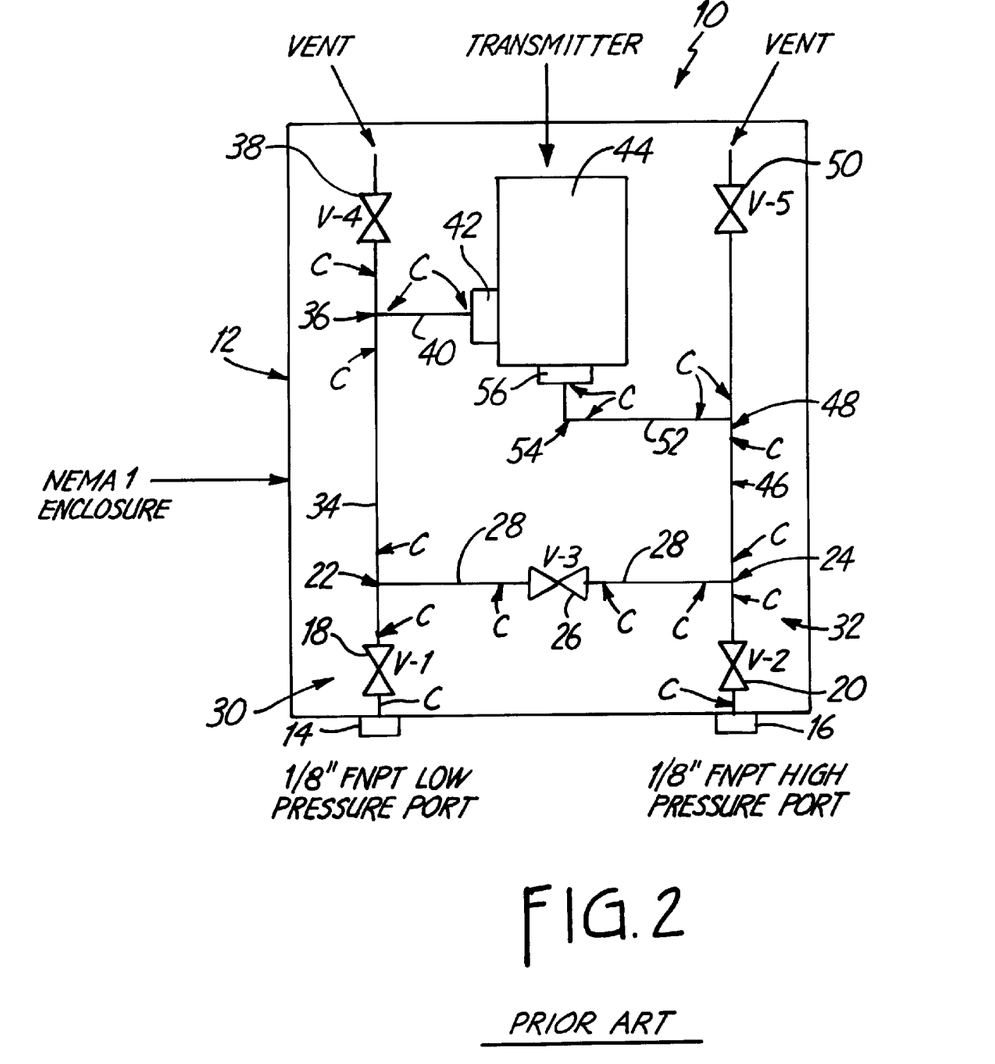
FIG. 2 is a schematic of the differential prior art differential pressure transmitter assembly of FIG. 1.

As shown in FIGS. 1 and 2, a prior art differential pressure transmitter 10 includes a number of generally standard components housed within an enclosure 12 (shown with cover removed). Typically, a first (low) pressure port 14 and a second (high) pressure port 16 are provided on the outside of the enclosure 12. The pressure ports 14,16 may include any known structure to facilitate field attachment to pressure lines (not shown) such as with a welded, soldered, threaded or compression joint.

On the inside of the enclosure 12, an first isolation valve 18 is attached in fluid communication with the low pressure port 14 and a second isolation valve 20 is attached in fluid communication with the high pressure port 16. Standard piping Ts 22,24 are connected to the downstream side of each of the first and second isolation valves 18,20. An equalization valve 26 is attached with standard copper tubing 28 between the downstream sides of the isolation valves 18,20. The equalization valve 26 is normally closed, but opens as desired to permit fluid communication between the first (low) pressure side 30 and the second (high) pressure side 32.

On the low pressure side 30, flexible tubing 34 is run up to an upper T36. One end of the upper T36 is fitted to a venting valve 38. The other end of the upper T36 is pipe-fitted 40 to a low pressure port 42 of a differential pressure sensor 44. On the high pressure side 32, flexible tubing 46 is run up to an opposing upper T48, which is similarly connected to a venting valve 50. The venting valves 38,50 are placed at a high location in the assembly 10 to gravitationally fill the lines 28,34,40,46,52 prior to closing the venting valves 38,50. A second side of the opposing upper T48 is connected with tubing 52 to an L54, which is then connected to a high pressure port 56 of the differential pressure sensor 44. The pressure transmitter 10 can have a single diaphragm or other sensor element (not independently shown) with two sides acted on by the opposing pressures or it could have two separate diaphragms or other sensor elements (not independently shown) with the signals electrically compared to generate a signal indicative of differential pressure.

While each of the components and materials used for the prior art differential pressure transmitter assembly 10 are common and inexpensive, the differential pressure transmitter assembly 10 requires a large number of components. Specifically, five valves 18,20,26,38,50, four T's 22,24,36, 48, an L54 and five lengths of tubing 28,34,40,46,52 are needed for each assembly 10. The assembly process must be done in each case manually, with a total of 18 pipe-fitting connections C. While using all standard low cost components, the assembly cost for cutting the tubing 28,40, 52 to length and making the 18 connections C is quite costly. The use of flexible tubing 34,46 helps to reduce the criticality of the length of the cut rigid tubing 28,40,52, but increases cost and decreases the robustness of the assembly. Each of 18 connections C must be made pressure tight to the pressures at which the unit 10 will be used, and each connection C is a potential leak source.

The procedure to place the prior art transmitter assembly 10 in service includes first opening the equalization valve 26 and the venting valves 38,50. The isolation valves 18,20 are then slowly opened to bleed the lines 28,34,40,46,52 of air. Once fully bled, the venting valves 38,50 are fully closed and the isolation valves 18,20 are fully opened. The equalization valve 26 is closed leaving a high pressure side 32 and a low pressure side 30 so the sensor 44 is reading a differential pressure. To take the prior art transmitter assembly 10 out of service, the equalization valve 26 is first opened so pressure is equalized at both ports 14,16 of the sensor 10. The isolation valves 18,20 are then closed, and the venting valves 38,50 are opened to release pressure. The sensor unit 44 may then be removed and replaced as necessary.

FIGS. 3–19 depict a preferred embodiment 60 of the present invention. While described as a differential pressure transmitter assembly 60 for two pressure lines, the present invention can be applied to a wide variety of pressure monitoring assemblies which involve two or more pressure lines. The differential pressure transmitter 60 includes two primary assemblies, an isolation valve assembly 62 and a pressure sensor assembly 64.

The isolation valve assembly 62 has a rigid manifold structure 66. In the preferred embodiment, the rigid manifold structure 66 is formed from a single block of stainless steel. Other materials could alternatively be used, but stainless steel provides high corrosion resistance and compatibility with numerous types of fluids used in pressurized industrial settings. Stainless steel also provides good strength and heat transfer characteristics. The stainless steel manifold 66, including threading on openings and communicating interior channels 68, 70, 98 (shown schematically in FIG. 3), can be formed with traditional metal forming methods such as casting and machining.

Figure 3:
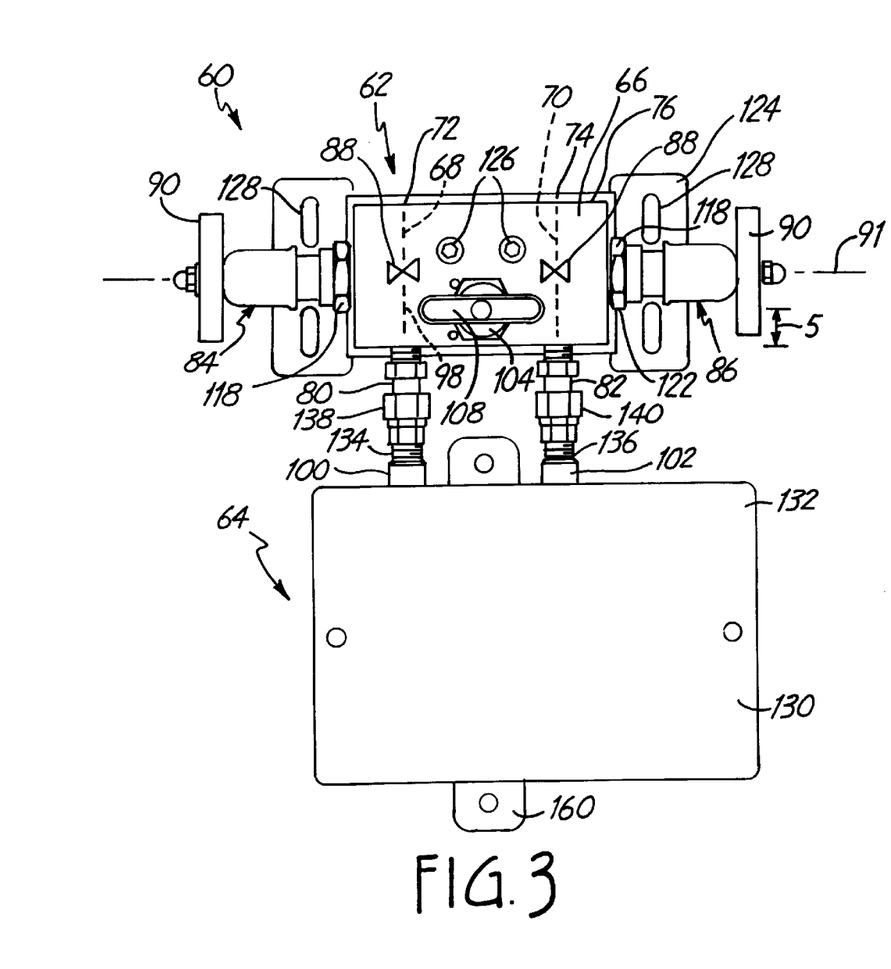
FIG. 3 is an elevational view of a preferred differential pressure sensor assembly of the present invention, with the interior of the manifold block shown in schematic.

Two pressure inlet ports 72, 74 are formed into the manifold 66. The inlet ports 72,74 may be formed into any face of the manifold 66, but are preferably formed on the same, upper face 76. The inlet ports 72,74 may include any convenient structure for attachment to fluid pressure input lines (not shown), such as a threaded or other attachment. Interior channels 68, 70 extend through the manifold 66 to place each outlet port 80,82 in fluid communication with its respective inlet port 72,74, dependent upon the position of an isolation valve 84, 86. The isolation valves 84,86 are attached to the manifold 66 with a flow blockage member 88 which controls flow from each inlet port 72,74 to its outlet port 80,82. Each isolation valve 84,86 may include any type of flow blockage member 88 as known in the art. Each isolation valve 84,86 includes a handle 90 for rotationally opening and closing the valve 84,86.

The first pressure outlet port 80 and the second pressure outlet port 82 are aligned in a parallel relationship. The parallel relationship is important for ease of attachment and detachment with the pressure sensor assembly 64. The spacing between the outlet ports 80,82 should be the minimum practicable for separate inlet ports 134,136 of the pressure sensor assembly 64. In the preferred embodiment, this spacing between outlet ports 80,82 is only about 2⅛ inches.

In the preferred embodiment, the isolation valves 84,86 are oriented off the sides of the manifold 66, with handles 90 which rotate about a horizontal axis 91 parallel to the mounting surface 96. This orientation of the isolation valve handles 90 allows the isolation valves 84,86 to have relatively large handles 90 for a considerable mechanical advantage without interference between the two isolation valve handles 90. Alternatively, the isolation valves 84,86 may be oriented with isolation valve handles rotating about an axis normal to the mounting surface 96, but such an orientation may require further spacing between the isolation valves 84,86.

In the preferred embodiment, an equalization connection 98 is formed in the manifold 66 between the two pressure lines 68, 70 and downstream of the isolation valves 84,86. The equalization connection 98 allows fluid communication between the two pressure outlet ports 80,82 through the rigid manifold 66, dependent upon the position of an equalization valve 104. The equalization valve 104 in its closed position must fully seal the first pressure line 68 from the second pressure line 70. In the preferred embodiment, the equalization valve 104 is a pin-in-seat valve. The seat for the pin is coated such as with TEFLON polytetrafluoroethylene. This pin-in-seat construction assures no leakage through the closed equalization valve 104, which otherwise could upset the pressure differential reading between the two pressure lines 68, 70. With the two isolation valve handles 90 oriented off the sides of the isolation valve manifold 66, the equalization valve handle 108 may extend off the from of the isolation valve manifold 66 without any interference between the handles 90,90,108 for the three valves 84,86, 104.

The equalization valve 104 is particularly important if a pressure sensor (not shown) is used having a diaphragm impacted on opposing sides by fluid pressure. For example, the magnitude of the pressure differential between the low fluid pressure and the high fluid pressure may be relatively small relative to the difference between the low fluid pressure and atmospheric. The equalization valve 104 allows both sides of the pressure sensor assembly to initially be exposed to the same pressure, so the internal diaphragm avoids damage by the large difference between the low fluid pressure and atmospheric. If the present invention is used to monitor absolute pressures of two or more fluid lines, or if a separate sensor 100 is used for low fluid pressure than the sensor 102 for high fluid pressure, then the equalization valve 104 and equalization channel 98 are optional.

The isolation valves 84,86 and the equalization valve 104 may be commercially purchased for threaded attachment into tapped openings in the manifold block 66. A hexagonal head 118 on each valve 84,86,104 allows wrench tightening of the valve body 84, 86, 104 to the manifold 66. To prevent loosening of the valves 84,86,104 from the manifold block 66, a spring pin 122 may be disposed in a recess machined in the manifold block 66. The spring pin 122 prevents a corner of the hexagonal head 118 from rotating past the spring pin 122 after the valve body 84, 86, 104 is screwed in place in the manifold block 66. To remove a valve 84,86,104, first the spring pin 122 must be removed, followed by counter-clock wise rotation of the hexagonal head 118.

Figure 15:
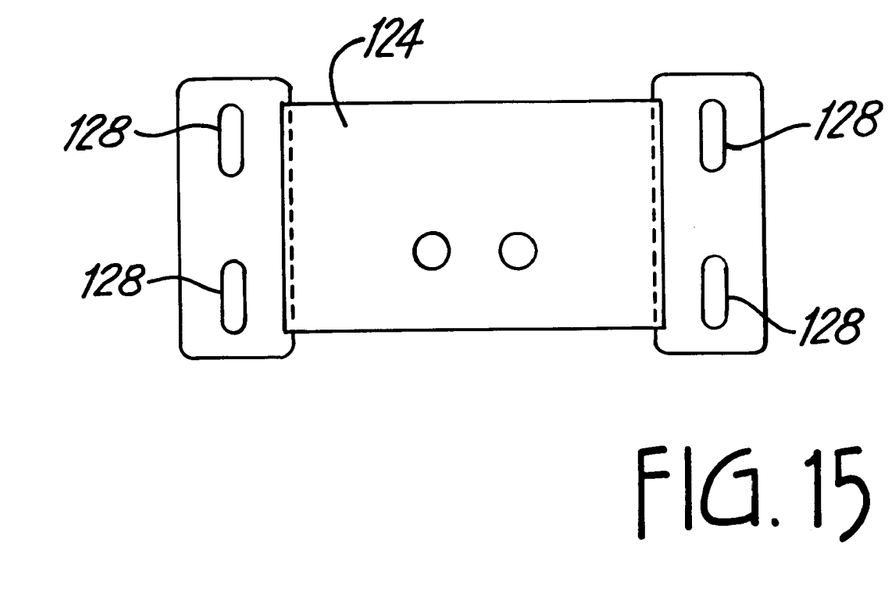
FIGS. 15–17 depict the preferred mounting bracket for the isolation valve assembly of FIG. 3.
Figure 16:
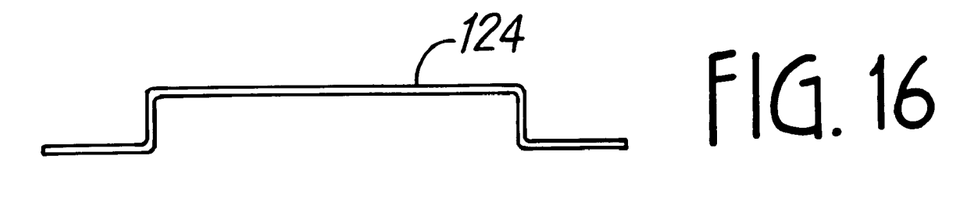
Figure 17:
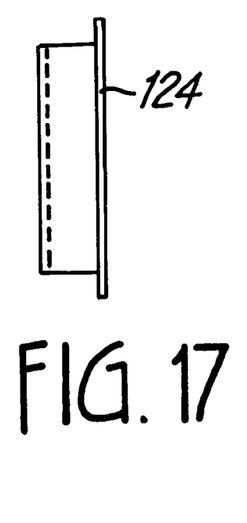
Figure 18:
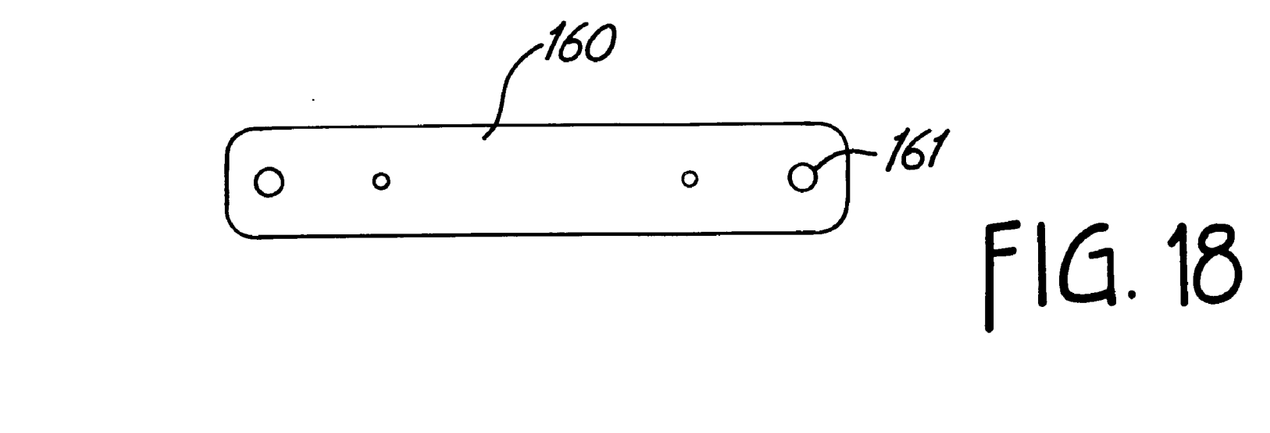
FIGS. 18 and 19 depict the preferred mounting bracket for the pressure sensor assembly of FIG. 3.
Figure 19:
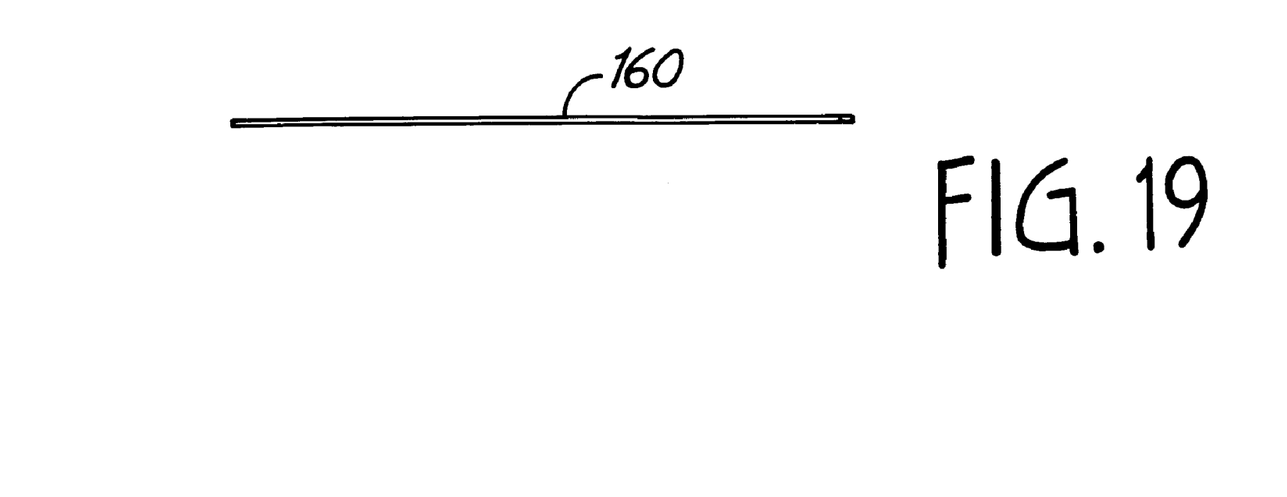

The isolation valve manifold 66 of the present invention is preferably supported by a mounting bracket 124, separately shown in FIGS. 15–17. The mounting bracket 124 may be integral with the single piece manifold 66, or may be attached to the manifold 66 in any way known. The preferred embodiment includes attachment bolts 126 which extend through the manifold block 66 to attach the mounting bracket 124 to the manifold 66. The mounting bracket 124 allows the isolation valve manifold 66 to be easily attached to an underlying surface 96.

In the preferred embodiment, oblong or elongate fastener holes 128 are provided on the mounting bracket 124, extending to the sides of the manifold 66. As shown in FIG. 3, the elongate fastener holes 128 are spaced and positioned to allow clearance relative to the isolation valve handles 90. The fastener holes 128 are elongated to allow adjustment of the position of the manifold 66 in the axial direction of the pressure outlet ports 80,82. For instance, in the preferred embodiment the elongated holes 128 allow ½ inch center to center spacings of a screw (not shown) through the attachment holes 128 so that the bracket 124 and attached manifold 66 can be moved ½ inch upward or downward, i.e., toward or away from the pressure sensor assembly 64.

The pressure sensor assembly 64 includes an enclosure 132 with a first (low) pressure sensor inlet port 134 and a second (high) pressure sensor inlet port 136. The enclosure 132 rigidly supports the two pressure sensor inlet ports 134,136. The pressure sensor ports 134,136 are aligned in a parallel relationship, and the spacing between the pressure sensor ports 134,136 is designed to equal the spacing between the pressure outlet ports 80,82 on the isolation valve assembly 62. This allows the pressure sensor assembly 64 and the isolation valve assembly 62 to be joined together without any flexible connections, simply by aligning the pressure sensor ports 134,136 with the pressure outlet ports 80,82 and sliding or advancing the isolation valve assembly 62 axially toward the pressure sensor assembly 64.

Figure 5:
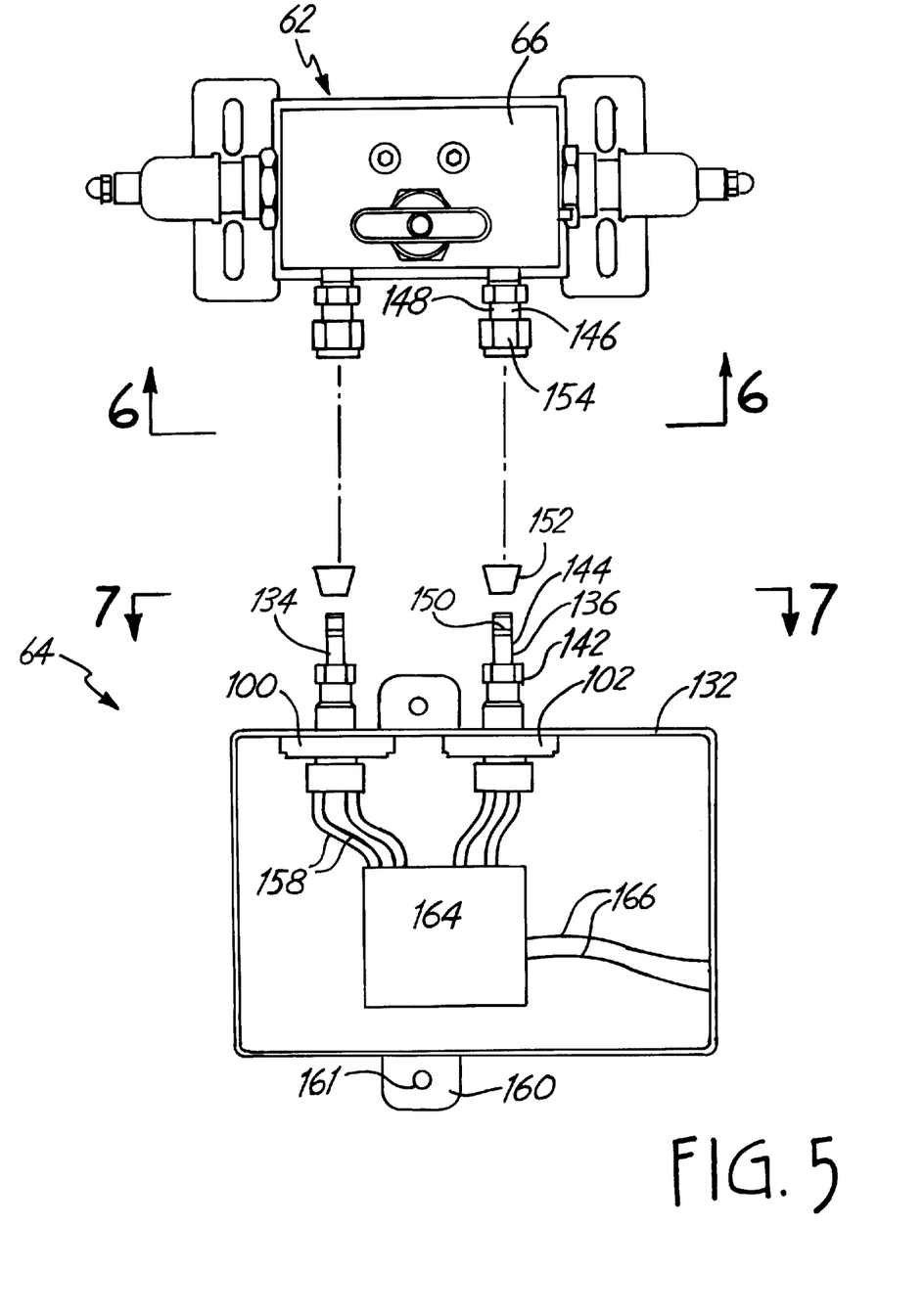
FIG. 5 is an exploded elevational view of the assembly of FIG. 3, shown with the cover of the sensor assembly removed.

Releaseable connectors 138,140 are provided to attach the pressure sensor ports 134,136 to the corresponding pressure outlet ports 80,82 of the isolation valve assembly 62. These connections must be pressure tight. The preferred connections are provided such as with stainless steel tube fittings available from Swagelok Co. of Solon, Ohio under part numbers "adapter SS-5-TA-1-4" and "connector SS-500-1-4". As best shown in FIG. 5, the portion of the connectors on the pressure sensor assembly 64 include a body 142 with a male tube extension 144, and the mating connector on the isolation valve assembly 62 includes a body 146 with a correspondingly sized female tube stub extension 148. An annular depression 150 is machined into the male tube stub extension 144 which defines a compression location for a ferrule 152, and a compressible ferrule 152 is positioned on the male tube stub extension 144. The male tube stub extension 144 is axially aligned and inserted into the female tube stub extension 148. The female tube stub extension 148 has external threads. The ferrule 152 is compressed onto the male tube stub extension 144 by rotational tightening of a compression nut 154 on the female tube stub threads. This forms a pressure tight connection, and the annular depression 150 and the ferrule 152 ensure that the connection cannot pull out.

In the preferred arrangement, the female tube stubs 148 are shown on the manifold 66 and the male tube stubs 144 are shown on the pressure sensor assembly 64, however, this orientation could be easily reversed. The male-female connections 138,140 allow the pressure sensor assembly 64 to be hung from the isolation valve assembly 62 or vice versa without tightening of the attachments. In contrast to the flexible tubing 34,46 of the prior art, the preferred connectors 138,140 are generally rigid and easily support the weight of the pressure sensor assembly 64 or the isolation valve assembly 62 without noticeable bending.

The enclosure or electrical box 132 for the pressure sensors 100, 102 includes a removable cover 130. The enclosure 132 includes an opening 156 (shown in FIG. 4) to pull wires from a control system (not shown) into the enclosure 132 to make electrical connection with the pressure sensor(s) 100, 102. The opening 156 may be sized as necessary for the desired use, including with a sealed electrical connection if desired. The electrical box 132 rigidly supports the pressure sensor(s) 100, 102, with the pressure sensor ports 134,136 exposed outside the electrical box 132. Electrical leads 158 outputting a signal from the pressure sensor(s) 100, 102 extend from the pressure sensor(s) 100, 102 within the electrical box 132.

Figure 4:
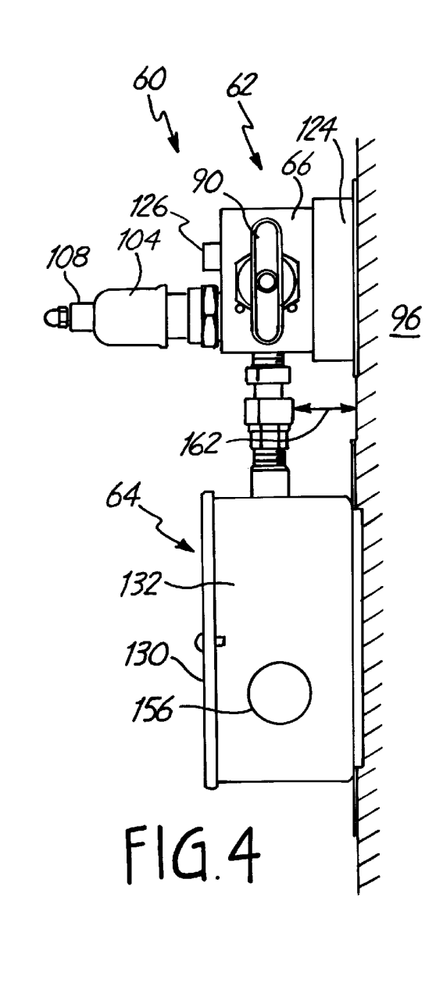
FIG. 4 is a side view of the assembly of FIG. 3.

A mounting bracket 160 may be integrally formed on the electrical box 132 or may be attached to the electrical box 132 such as by riveting or by any other means. In the preferred embodiment, the enclosure 132, cover 130 and mounting bracket 160 are each fabricated out of 16 gauge steel. As best shown in FIG. 4, the mounting bracket 160 and the electrical box 132 are designed to position the pressure sensor ports 134,136 at a clearance 162 from an underlying planar surface 96. Similarly, the mounting bracket 124 and the manifold block 66 are designed to position the pressure outlet port 80,82 at a mating clearance 162, so the pressure sensor ports 134,136 and the pressure outlet ports 80,82 readily align when both the isolation valve assembly 62 and the pressure sensor assembly 64 are placed on a planar surface 96. In the preferred embodiment, the axes of the pressure outlet ports 80, 82 and the pressure sensor ports 134, 136 are 1¼ inches from the underlying planar surface 96. Attachment is easily accomplished by sliding the pressure sensor assembly 64 and the isolation valve assembly 62 together on the planar surface 96.

The mounting bracket 160 includes fastener holes 161, however, the present invention does not require placement of fasteners through these fastener holes 161. The rigid connectors 138, 140 readily support the weight of the pressure sensor assembly 64, and may if desired provide the sole mounting support for the pressure sensor assembly 64.

As best shown in FIGS. 3 and 5, two separate pressure sensors 100, 102 are preferably used, one sensor 102 associated with the high pressure line 70 and a separate sensor 100 associated with the low pressure line 68. An electrical comparator circuit 164 is provided as known in the art to electronically compare the two pressure signals from sensors 100,102 and output an electrical signal representative of differential fluid pressure. Electrical leads 166 from the comparator circuit 164 are then attached to the electrical lines for the control system (not shown).

Each pressure sensor 100, 102 is preferably formed with a hollow housing 168 which forms a chamber for fluid to press against a pressure diaphragm 170, as best shown in FIGS. 8–11. The exterior of the housing 168 is formed as a single monolithic element, which may be conceptually divided into four parts: a body 182, a flange 184, a neck 186 and a cap 188.

The body 182 is a rigid cylindrical structure. One end of the body 182 contains a threaded opening 190 for receiving a tube or pipe such as connectors 138, 140. The exterior of the cylindrical body 182 includes two parallel flats 192. The flats 192 allow the body 182 to be rotationally held, either by a tool during assembly or by the wall of the enclosure 132. The positioning of these flats 192, away from the diaphragm 170, is important such that the housing 168 shields the diaphragm 170 from any mounting stresses, which could otherwise affect the output of the diaphragm 170. All of the mounting stresses are absorbed between the flats 192 and the flange 184 without reaching the diaphragm 170.

Additionally, the positioning of the flats 192 is important in that it permits the use of screws 198 (shown in FIG. 7) to secure the flange 184 to the enclosure 132. In the preferred embodiment, each sensor 100,102 is aligned such that the flats 192 are visible on either side of the sensor 100,102, perpendicular to the mounting surface 96. This alignment allows a worker to grip the flats 192 with a tool, and allows easy access to the screws 198 in the bore holes 196 both during assembly and during routine maintenance.

In the preferred embodiment, the body 182 has an outer diameter of ⅝ inches on its curved surfaces and ½ inch thickness between flats 192. The inside diameter of the body 182 is approximately 0.315 inches (slightly larger in the threaded area). While the inner diameter, outer diameter, and thickness between flats 192 could be different, the preferred embodiment is designed to match standard piping and tools.

The flange 184 has an exterior diameter larger than the exterior diameter of the body 182, such that the union of the body 182 and the flange 184 creates a flat surface 194, which is perpendicular to the central axis and to the two parallel flats 192 of the body 182. Two bore holes 196 extend into the flat surface 194 of the flange 184, in parallel with the central axis. In the preferred embodiment, screws 198 (shown in FIG. 7) are employed to rigidly attach the flange 184 to the enclosure 132. One bore hole 196 is positioned adjacent to each of the flat surfaces 192 of the body 182. This positioning allows for additional space for use of a screw driver or other tool to tighten the screws 198.

The flat surface 194 of the flange 184 should be diametrically large enough that bore holes 196 can be appropriately positioned to receive mounting screws 198 with heads. The bore holes 196 preferably do not extend all the way through the flange 184. The thickness and the diameter of the flange 184 may vary, but the flange 184 should be thick enough to house bore holes 196 extending less than the full thickness of the flange 184. With this size of flange 184, a seal can be established between the flat surface 194 and the enclosure 132, and the bore holes 196 do not jeopardize the integrity of such a seal. Such a seal for the enclosure 132 may be important depending upon an influence of internal pressure in the enclosure 132 on the output of the sensors 100, 102. Such a seal for the enclosure 132 may also be important to protect the sensor 100,102 and particularly the diaphragm 170 from the environment in which the assembly 60 is used, such as against corrosive effects.

In the preferred embodiment, the flange 184 is machined to have a smooth, circular outer edge 204. The generally curved edge 204 prevents gripping of the flange 184 with a tool either during assembly or during maintenance, thereby reducing potential mounting stresses on the flange 184 which could stress the diaphragm 170. The preferred outer diameter of the flange 184 is 1¼ inches, with a thickness of about ⅜ inches. The two bore holes 196 are 0.312 inches deep, and are positioned adjacent the two flats 192, equally spaced between the flats 192 and the outer diameter.

On the other side of the flange 184 (the side opposite to the body 182), the flange 184 is rigidly attached to the neck 186. The neck 186 is rigidly attached to a cap 188. The diaphragm 170 may be supported between the neck 186 and the cap 188.

In the preferred embodiment, the neck 186 is approximately 0.125 inches long, and has a diameter of 0.434 inches. The cap 188 is 0.100 inches long, and 0.725 inches in diameter. The neck 186 and cap 188 are designed to be small and to provide no surface for gripping by a tool either during assembly or maintenance, thereby protecting the diaphragm 170 from potential stress.

In the preferred embodiment, the housing 168 for each sensor 100,102 is machined from a 1.25 inch round rod type 17-4PH cold drawn, tempered H-900 per ASTM A630. The finish surface of the housing 168 opposite the diaphragm 170 must be free of nicks, gouges, scratches, dents or other surface defects due to machining or handling. Any defects may jeopardize the seal between the diaphragm 170 and the housing 168, resulting in an inaccurate pressure reading. While in the present case, the sensor housing 168 has a substantially cylindrical form, the sensor housing 168 may be machined in other shapes. In particular, the flange 184, neck 186 and cap 188 need not be cylindrical, provided the flat surface 194 extends in normal relation to the body 182 so as to allow for rigid attachment of the sensor 100, 102 to the enclosure 132. If not cylindrical, a worker may unwittingly apply a tool to the housing 168 in a manner to stress the diaphragm 170.

With separate pressure sensors 100, 102, the diaphragm 170 of each pressure sensor 100, 102 may be selected as appropriate for the operating pressure of the pressure lines 68, 70. Alternatively, the diaphragms 170 in the pressure sensors 100, 102 may be identical, in which case the "high pressure" and "low pressure" sides of the assemblies 62, 64 can be switched as convenient.

The heat transfer characteristics of the manifold 66 are more important due to the reduced length of fluid connections between the isolation valves 84,86 and the pressure sensor 170,172. In particular, the pressure monitoring assembly 60 may be used to monitor heated fluids, such as hot water or steam, or other heated fluids in an industrial environment. Depending upon their construction, the pressure sensor(s) 100,102 may be sensitive to heat. It is accordingly desired to minimize heat transfer from the pressurized fluid to the pressure sensors 100, 102. In the prior art differential pressure transmitter 10 of FIGS. 1 and 2, the sensor unit 44 is thermally separated from the isolation valves 18,20 due to the significant length of the connections between the isolation valves 18,20 and the sensor unit 44. That is, the substantial length and surface area of the tubing 34,46,40,52 provided sufficient cooling that the prior art pressure sensor unit 44 was not exposed to the full heat and temperature of the pressurized fluid.

In the present invention, the pressure sensor(s) 100,102 are positioned much closer to the isolation valves 84,86 than in the prior art. For instance, the linear distance between each pressure sensor 100,102 and its corresponding isolation valve 84,86 is six inches or less. In the preferred embodiment, the diaphragm 170 of each preferred pressure sensor 100, 102 is only about 3½ inches from the flow blockage member 88 of the corresponding isolation valve 84,86. This closer distance makes heat transfer much more significant.

The first way to minimize heat transfer to the pressure sensor(s) 100, 102 is through placement of the pressure sensor assembly 64 relative to the isolation valve assembly 62. In contrast to the prior art, the present pressure sensor assembly 64 is preferably positioned underneath the isolation valve assembly 62. The pressure sensor(s) 100, 102 are typically more sensitive to an elevated temperature of a pressurized fluid than to a reduced temperature. Heat generally rises, and placement of the pressure sensor assembly 64 directly beneath the isolation valve assembly 62 reduces heat transfer from the pressurized fluid and isolation valve assembly 62 to the pressure sensor assembly 64.

The monolithic manifold 66 of the present invention helps thermally separate the pressure sensor(s) 100, 102 from the pressurized fluids. The thermal mass of the manifold 66 minimizes thermal shock effects associated with abrupt changes in temperature of the pressurized fluids. The high thermal conductivity and the large surface area of the manifold 66 increases thermal conduction from the pressurized fluids to the ambient atmosphere, bringing the pressurized fluid temperature closer to ambient at contact with the pressure sensor(s) 100, 102. The preferred manifold 66 is unitarily formed from a single block of metal having an exterior surface area of at least about 10 square inches. In the most preferred embodiment, the manifold 66 is a block with dimensions of about 1¼×2×3 inches, for an exterior surface area of about 24½ square inches.

Figure 6:
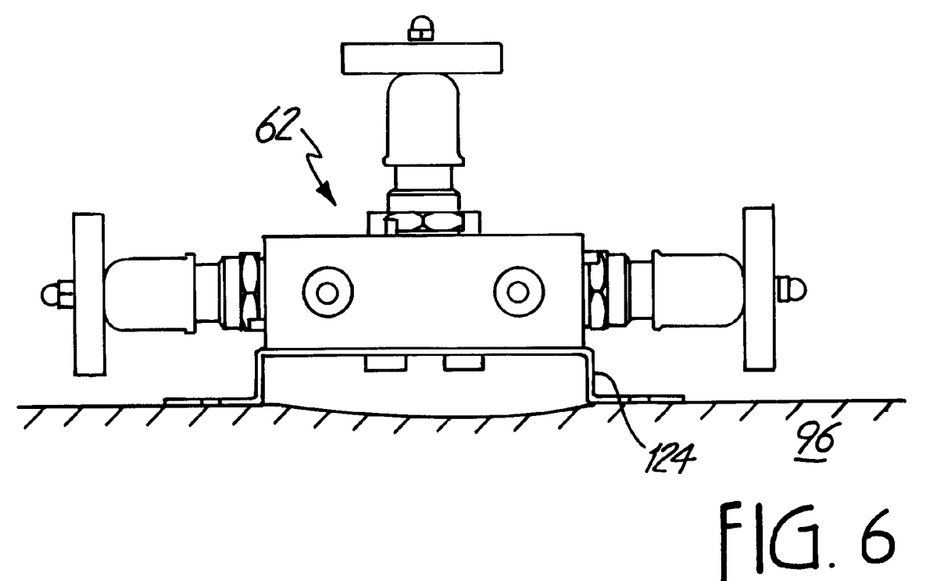
FIG. 6 is a plan view of the isolation valve assembly taken along line 6—6 in FIG. 5.
Figure 7:
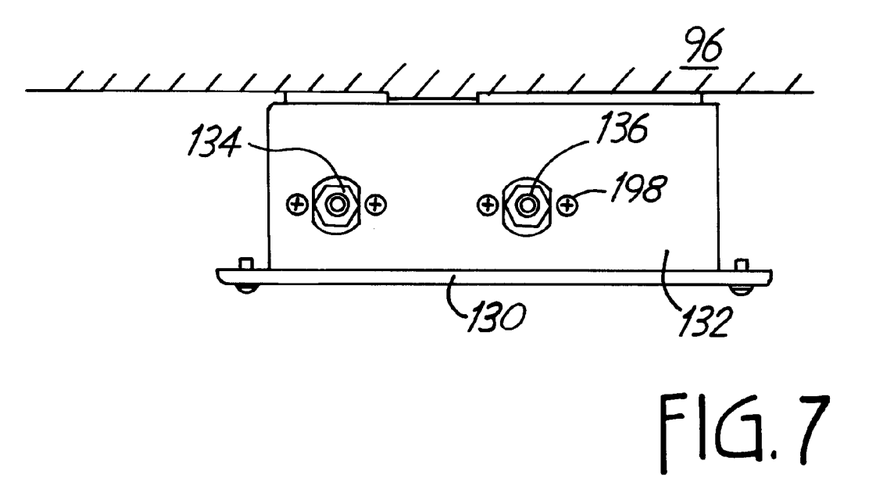
FIG. 7 is a plan view of the pressure sensor assembly unit taken along line 7—7 in FIG. 5.
Figure 8:
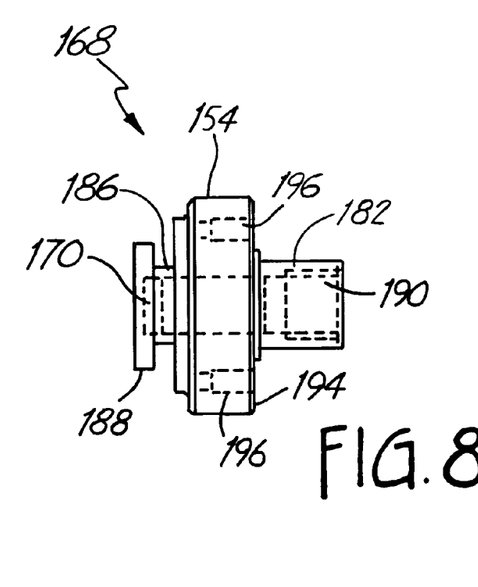
FIGS. 8–11 depict the preferred housing of the pressure sensor for use in the pressure sensor assembly of FIG. 3.
Figure 9:
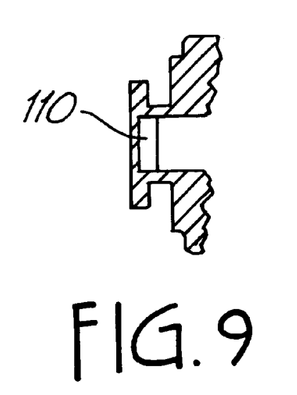
Figure 10:
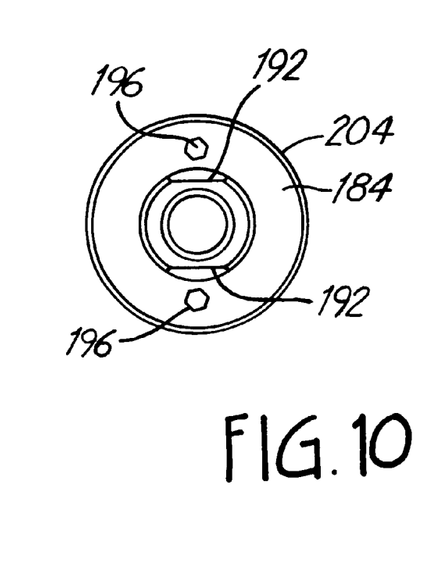
Figure 11:
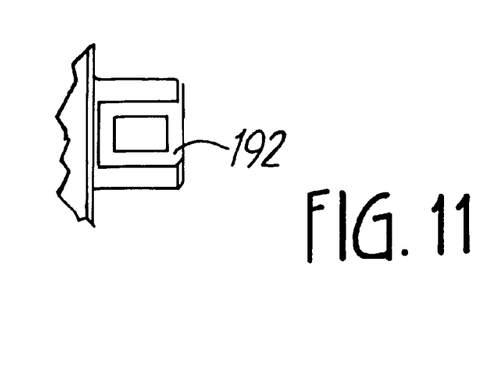
Figure 12:
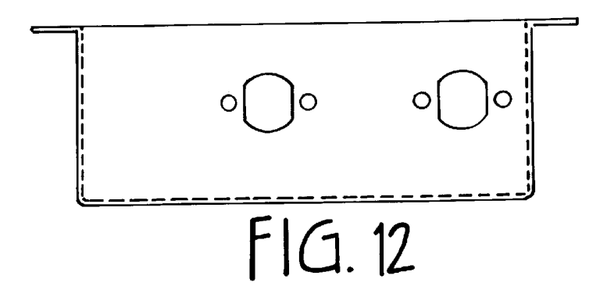
FIGS. 12–14 depict the preferred enclosure for the pressure sensor assembly of FIG. 3.
Figure 13:
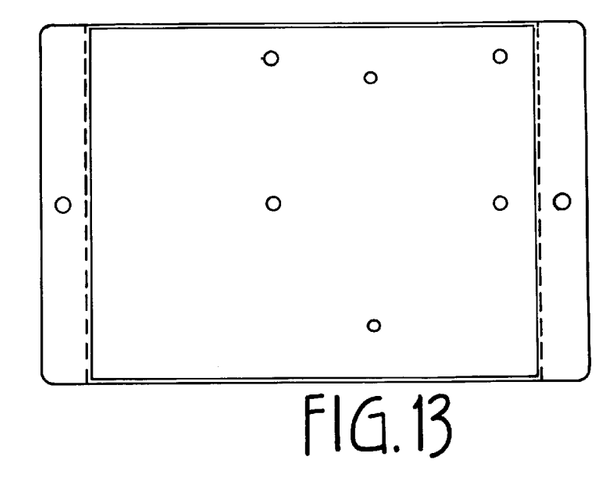
Figure 14:
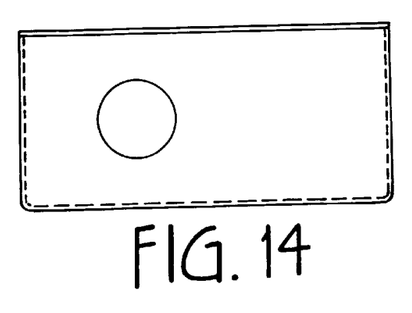

Further, as shown in FIG. 6 the attachment bracket 124 is bent to separate the manifold 66 off of the underlying surface 96 to which the isolation valve assembly 62 is mounted. In the preferred embodiment, the attachment bracket 124 provides a separation of about ½ inch. This separation distance allows air flow between the manifold 66 and the underlying attachment surface 124 for enhanced heat transfer from the manifold 66. If desired, the manifold 66 could be finned to further enhance heat transfer from the pressurized fluid to ambient.

The short distance between the pressure sensor(s) 100,102 and the isolation valves 84,86 provides another, separate important advantage of the present invention. In particular, the length of the fluid connections past the first and second isolation valves 84,86 should be minimized, such as to a value less than about fourteen linear inches. These fluid connections include both portions of the pressure lines 68,70 to the pressure sensor(s) 100,102 and the length of the equalization connection 98. In the present invention, the equalization connection 98 through the manifold 66 is only about 2⅛ inches long, much shorter than the equalization connection 26,28 of the prior art. With the length from the isolation valves 84,86 to the pressure sensors 100,102 being only 3½ inches, the present preferred embodiment provides a total length of fluid connections past the isolation valves 84,86 of about 9⅛ inches. This reduced length of fluid connections past the isolation valves 84,86 provides for much less trapped air in the system as compared to the prior art. The little air that may be trapped initially upon startup is preferably absorbed into the pressure line system due to the orientation of the pressure sensor assembly 64 and the isolation valve assembly 62. That is, the small amount of air in the assemblies 62,64 upon startup travels upward past the isolation valves 84,86 and upward into the attached high and low pressure lines. With these advantages, the present differential pressure transmitter 60 is designed without either of the two bleeding valves of the prior art, which further results in cost savings.

The procedures to place the preferred embodiment into and out of service are much simpler than the prior art, as well. After the connections are made, the two isolation valves 84,86 may be directly opened to place the pressure sensor assembly 64 in service between the high and low pressures. No bleeding is necessary. Thus, while isolation valves 84,86 must be adjustable between opened and closed positions, there is no need for isolation valves 84,86 to be adjustable to a "slightly opened" position. To take the preferred embodiment out of service, the isolation valves 84,86 are simply fully closed. The pressure sensor assembly 64 may then be removed by loosening of the compression nuts 154 on the tube stubs extensions 148, and the pressure sensor assembly 64 may be repaired and/or replaced as necessary.

Although the present invention has been described with reference to preferred embodiments, workers skilled in the art will recognize that changes may be made in form and detail without departing from the spirit and scope of the invention. For example, the isolation valve assembly and particularly the manifold can take many different shapes. Many alternative types of valves, connections and pressure sensors can be used. The invention is equally applicable for use on systems with more than two pressure lines being monitored.

What is claimed is:

1. A sensor comprising,
 a sensing element for electrically sensing a parameter of a fluid; and
 a sensor housing for supporting the sensing element in fluid communication with a fluid, the sensor housing having a smooth attachment surface in sealed attachment with the sensing element, the sensor housing defining an interior chamber having a chamber axis and being closed on one end by the sensing element, the sensor housing having a threaded opening opposite the sensing element, the threaded opening adapted for rotational attachment to a tubing structure via rotation about the chamber axis, the interior chamber allowing fluid communication between the sensing element and the attached tubing structure, the sensor housing comprising,
  a flange for connecting the sensing element to a wall structure, the flange extending from the sensor housing defining a planar surface normal to the chamber axis, the planar surface having at least one threaded bore hole for receiving a threaded fastener, the bore hole extending into the flange less than the full width of the flange.

2. The sensor of claim 1 wherein the bore hole extends into the planar surface of the flange substantially normal to a planar surface of the flange and substantially parallel to the central axis of the interior chamber.

3. The sensor of claim 1 wherein a body extends from the planar surface of the flange, the body defining the threaded opening to the interior chamber, the body defining an outer diameter and having flats within the outer diameter normal to the planar surface of the flange, each bore hole being positioned such that a head of a threaded fastener advanced into the bore hole falls within the outer diameter of the body, the flats allowing for torquing the body about the chamber axis, and the flats permitting the head of the threaded fastener to advance to the planar surface of the flange.

4. The sensor of claim 3 wherein the flange and a remainder of the sensor housing opposite the body have a circular profile.

5. The sensor of claim 1 wherein a body extends from the planar surface of the flange opposite the sensing element, the body providing the threaded opening, the body having at least one flat normal to the planar surface of the flange and adjacent the bore hole.

6. The sensor of claim 3 further comprising threaded fasteners sized to fit the bore holes for rigidly attaching the sensor to a wall structure, the threaded fasteners having heads sized to avoid interference with the flats when the threaded fastener is in the bore hole.

7. The sensor of claim 6 further comprising a wall structure with an opening sized to fit the threaded fasteners with the threaded fasteners rigidly affixing the sensor to the wall structure.

8. A method of attaching a sensor to a wall structure, the method comprising:
   positioning a sensor relative to an opening in a wall structure, the sensor comprising;
   a sensing element for electrically determining a parameter of a fluid; and
   a sensor housing for supporting the sensing element in fluid communication with a fluid, the sensor housing having a smooth attachment surface in sealed attachment with the sensing element, the sensor housing defining an interior chamber closed on one end by the sensing element, the sensor housing having a threaded opening opposite the sensing element, the sensor housing comprising;
   a flange for connecting the sensing element to a wall structure, the flange extending from the sensor housing defining a planar surface normal to a central axis of the interior chamber, the planar surface having at least one threaded bore hole for receiving a threaded screw, the bore hole extending into the flange less than the full width of the flange;
   screwing a threaded screw through the wall structure and into the at least one bore hole in the flange thereby attaching the sensor to the wall structure;
   attaching a tube into the threaded opening of the interior chamber and rotating the tube relative to the sensor housing to rotationally tighten the tube, sealing the tube in fluid communication with the interior chamber through an opening in the wall structure; and
   attaching electrical leads to the sensing element.

9. The method of claim 8 wherein the sensor housing further comprises:
   a body extending from a side of the flange opposite the sensing element, the body having two flats perpendicular to the planar surface of the flange, the body defining a threaded interior surface in fluid communication with the interior chamber, the body having an open end opposite the interior chamber;
   and wherein the positioning act comprises:
   inserting the body through the opening in the wall structure such that the wall structure mates with the flats to prevent rotation of the sensor housing relative to the wall structure.

10. The method of claim 8 wherein the sensor housing further comprises:
    a body extending from a side of the flange opposite the sensing element, the body having a non-circular shape, the body defining a threaded interior surface in fluid communication with the interior chamber, the body having an open end opposite the interior chamber;
    the method further comprising,
    forming an opening in the wall structure, the opening having a non-circular shape sized to fit the body;
    and wherein the positioning act comprises:
    inserting the body through the opening in the wall structure such that the wall structure mates with the opening to prevent rotation of the sensor housing relative to the wall structure.

11. The method of claim 9 wherein the attaching act comprises, holding the body by the flats.

12. The method of claim 8 wherein the method further comprises,
    tightening a threaded screw through the wall structure and into the bore hole in the flange, the screw extending approximately perpendicular to the planar surface of the flange and substantially parallel to a central axis of the interior chamber; and
    tightening the threaded screw such that the screw extends into the flange less than the full width of the flange.

13. The method of claim 8, the method further comprising,
    generating an electrical signal across the electrical leads representative of the parameter sensed by the sensing element.

14. A sensor comprising,
    an electrical sensing element for sensing a parameter of a fluid; and
    a sensor housing for supporting the sensing element in fluid communication with a fluid, the sensor housing having a smooth attachment surface in sealed attachment with the sensing element, the sensor housing defining an interior chamber closed on one end by the sensing element, the sensor housing having a threaded opening opposite the sensing element, the threaded opening adapted for rotational attachment to a tubing structure by rotation about the chamber axis, the interior chamber allowing fluid communication between the sensing element and the tubing structure, the sensor housing comprising,
    a flange for connecting the sensing element to a wall structure, the flange extending from the sensor housing defining a planar surface normal to a central axis of the interior chamber, the planar surface having at least one threaded bore hole for receiving a threaded screw, the flange having a circular profile; and
    a body portion extending from the flange opposite the sensing element, the body portion defining the threaded opening, the body portion having a non-circular profile allowing torquing about the central axis of the interior chamber.

15. The sensor of claim 13 wherein the sensor housing is formed from a unitary metal rod.

16. The sensor of claim 13 wherein the bore hole extends less than the full thickness of the flange, the bore hole extending into the planar surface of the flange substantially normal to a planar surface of the flange.

17. The sensor of claim 13 further comprising threaded screws sized to fit the bore holes extending into the bore holes, the threaded screws for rigidly attaching the sensor to a wall structure.

18. The sensor of claim 13 wherein the sensing element comprises a pressure sensor diaphragm.

19. The sensor of claim 13 wherein a body extends from the planar surface of the flange, the body defining the threaded opening to the interior chamber, the body defining an outer diameter and having flats within the outer diameter normal to the planar surface of the flange, each bore hole being positioned such that a head of a screw threaded into the bore hole falls within the outer diameter of the body, the flats allowing for torquing the body about the chamber axis, and the flats permitting the head of the screw to advance to the planar surface of the flange.

20. The sensor of claim 13 further comprising electrical leads extending from the sensing element.

21. The sensor of claim 13, wherein the sensor housing is formed from a unitary metal rod;

electrical leads extend from the sensing element;

the bore hole extends less than the full thickness of the flange, the bore hole extending into the planar surface of the flange substantially normal to a planar surface of the flange;

the sensor housing is rigidly attached to a structure using threaded screws sized to fit the bore holes;

the sensing element is a pressure sensor diaphragm;

a body extends from the planar surface of the flange, the body defining the threaded opening to the interior chamber, the body defining an outer diameter and having flats within the outer diameter normal to the planar surface of the flange, each bore hole being positioned such that a head of a screw threaded into the bore hole falls within the outer diameter of the body, the flats allowing for torquing the body about the chamber axis, and the flats permitting the head of the screw to advance to the planar surface of the flange; and the flange and a remainder of the sensor housing opposite the body have a circular profile.

\* \* \* \* \*